(12) United States Patent
Karassiouk

(10) Patent No.: US 8,130,374 B2
(45) Date of Patent: Mar. 6, 2012

(54) CALIBRATION OF A SPATIAL LIGHT MODULATOR

(75) Inventor: Valentine A. Karassiouk, Vancouver (CA)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 13/245,143

(22) Filed: Sep. 26, 2011

(65) Prior Publication Data

US 2012/0013900 A1    Jan. 19, 2012

Related U.S. Application Data

(62) Division of application No. 12/609,075, filed on Oct. 30, 2009.

(51) Int. Cl.
*G01J 1/10* (2006.01)
(52) U.S. Cl. .................... 356/243.8; 356/243.1
(58) Field of Classification Search ............... 356/243.8, 356/243.1; 347/134–135, 142–144, 239, 347/253, 255, 236, 241, 246, 256, 237, 247, 347/238, 240; 702/85; 345/63; 250/237 G, 250/252.1
See application file for complete search history.

(56) References Cited

U.S. PATENT DOCUMENTS

| 6,686,946 | B2 | 2/2004 | Masuda et al. |
| 6,956,596 | B2 | 10/2005 | Kataoka et al. |
| 7,061,586 | B2 | 6/2006 | Sytsma et al. |
| 2003/0189635 | A1 | 10/2003 | Comeau et al. |

FOREIGN PATENT DOCUMENTS

WO    WO 2008/015515    2/2008

*Primary Examiner* — Tri T Ton
(74) *Attorney, Agent, or Firm* — Nelson Adrian Blish

(57) ABSTRACT

A method for calibrating a spatial light modulator comprising an array of channels includes selecting a plurality of channel sets; operating each of the channel sets to provide corresponding output radiation; providing a detector for measuring the output radiation; determining a plurality of intensity values, each representing an intensity of the output radiation provided by a different one of the channel sets; providing a correction factor for each of the channels sets, wherein each correction factor remains constant during a subsequent recalibration of the spatial light modulator; modifying each determined intensity value in accordance with a corresponding one of the correction factors; determining a difference between one of the modified intensity values and a target intensity value; and reducing the determined difference by adjusting a control level of at least one channel in the channel set corresponding to the one of the modified intensity values.

9 Claims, 9 Drawing Sheets

CALIBRATION OF A SPATIAL LIGHT MODULATOR

CROSS REFERENCE TO RELATED APPLICATIONS

This application is a Divisional of prior U.S. patent application Ser. No. 12/609,075, filed Oct. 30, 2009 (now U.S. Publication No. 2011/0102780), which is hereby incorporated herein by reference in its entirety.

FIELD OF THE INVENTION

The invention relates to apparatus for forming images on a surface, and more particularly to improvements in the calibration of a spatial light modulator employed by the apparatus.

BACKGROUND OF THE INVENTION

Spatial light modulators, also referred to as light valves, have found use in many different fields. One particular industrial field in which these devices have been employed is the display industry. Another field where spatial light modulators have made a significant impact is the printing industry, where they are extensively used with lasers to image various recording media. Recording media can include various printing plates, printing sleeves, and printing cylinders for example. The lasers employed in these applications often emit radiation having wavelengths suitable for marking a sensitized surface of the recording media. In some cases the lasers emit radiation comprising near-infrared or ultraviolet wavelengths.

Spatial light modulators typically include a one or two-dimensional array of light valve channels. Each of the channels can be selectively operated to provide an output radiation beam which can be used to form a unit element of an image typically referred to as an image pixel. In some cases, an output radiation beam is provided by reflecting radiation from the spatial light modulator. In some cases, an output radiation beam is provided by transmitting radiation through a spatial light modulator.

One particular subset of spatial light modulators is based on the reflection of incident radiation from micro-miniature deformable mirrors. Prior art deformable mirror light modulators can be generally divided into several types. For example, cantilever or hinged mirror light modulators deflect radiation when bending or tilting the mirror elements. A well-known example in this category is the digital micro-mirror device (DMD) technology developed by Texas Instruments Incorporated. Membrane light modulators employ a flat membrane that is deformed into a concave or spherical mirror which focuses radiation.

Another subset of spatial light valves diffracts radiation by forming a periodic physical pattern. A well-known example in this category is the grating light valve developed by the Silicon Light Machines Corporation of Sunnyvale, Calif. Total internal reflection (TIR) spatial light modulators include an electro-optic material whose optical properties change in accordance with the strength of an electric field established within the material. Conventional TIR modulators typically include a plurality of electrodes that are arranged in an interdigitated relationship on a support surface of an electro-optic member. Other surfaces of the member are arranged to cause input radiation to refract and undergo total internal reflection at the support surface. Upon the application of a suitable voltage to a corresponding one of the electrode sets, an electric field is established in a portion of the electro-optic member which alters the refractive index of the member and causes the electrode set to behave in a manner similar to a diffraction grating.

Spatial light modulators can require calibration for various reasons. For example, in imaging applications calibration may be required to alleviate image artifacts. Typically, there are a number of imaging parameters that need to be optimally set to achieve a desired quality result. One important parameter is the level of radiation exposure provided on the recording media. Exposure is typically defined as the amount of radiant energy per unit area that impinges on the recording media during the imaging process. Depending on the recording media, it may be necessary to control this parameter to within a few percent or less. This situation is further compounded when multiple output radiation beams are provided by a spatial light modulator. In this case, each beam needs to impart a substantially equal exposure on the recording media so that various artifacts including banding are not created.

Calibration of spatial light modulators can include balancing the various radiation beam intensities provided by an array of modulator channels in a process typically referred to as beam balancing. Beam balancing techniques attempt to establish a desired intensity distribution (i.e. also referred to as intensity profile) across all the output radiation beams that can be provided by the channels of a spatial light modulator. To achieve a desired intensity profile, one needs to know with some degree of certainty how each image pixel changes in response to change in the control settings of a channel corresponding to the image pixel and possibly, channels that neighbor the corresponding channel.

Some conventional beam balancing methods have employed multi-value detectors to measure an intensity profile. Some conventional multi-value detectors typically include a plurality of detection elements whose number equal, or exceed the number of spatial modulator channels that are activated to provide the detected output radiation beams. Radiation from each of a plurality of different sets of the modulator channels can be simultaneously detected by multi-value detectors to provide a spatial distribution of intensity values, each of the intensity values corresponding to the radiation provided by a different one of the modulator channel sets. In the limit, multi-value detectors can be employed to determine an intensity profile across entirety of the modulator array on the basis of single channel resolutions. Examples of multi-value detectors include laser beam profilers that are diagnostic devices that can measure the entirety of an intensity profile of a supplied radiation. Beam profilers can be used to accurately determine a detailed intensity profile shape of a plurality of radiation beams. Beam profilers can include photo-sensor based beam profilers that comprise visible or near-infrared CCD or CMOS sensors. Beam profilers can include scanning beam profilers that scan a beam profile with various pinholes, slits, or knife edges.

Despite their accuracy and resolution, many multi-value detectors can be considered to be prohibitively expensive if they are to be incorporated into a recording apparatus. To alleviate these costs issues, the use of single-value detectors has been proposed for use in the detection of output radiation beam intensity. Single-value detectors are simpler, less complicated, and less expensive than multi-level detectors. In a similar fashion to multi-value detectors, single-value detectors can simultaneously detect radiation from each of a plurality of modulator channels. However, single-value detectors can not distinguish between the different portions of the radiation provided by each of the modulator channels. Consequently, single-value detectors provide only a single intensity value representing the total radiation that is provided. The data determined by using a single-value detector does not contain any information on how the radiation intensity is spatially distributed. In particular, it does not indicate how much energy each image pixel would receive during exposure.

To overcome this shortcoming, single-value detectors can be employed to provide an intensity profile for all the operable channels in a spatial light modulator by dividing all the modulator channels into sets and individually activating each set to provide corresponding radiation which is separately measured by the detector. An intensity value is separately determined for each of the channel sets and an intensity profile is generated by mapping each of the separately determined intensity values with positional information of a corresponding one of the channel sets. For example, a portion of the intensity profile can be generated by measuring the total intensity of radiation provided by a first one of the channel sets while the remaining channels are turned off. Repeating this measurement for each of a sequence of different channels sets making up the remainder of the spatial light modulator provides a set of intensity values representing the intensity profile.

The number of channels employed in each of the channels sets during this process is typically based on several factors. For example, channel sets comprising only a few channels each can provide a suitable granularity for making effective corrections to intensity deviations highlighted by a subsequently determined intensity profile. However, larger numbers of these channel sets having fewer channels would be required to complete the intensity profile thereby increasing the calibration time. The present inventors have additionally determined that the number of channels employed in each channel set also has an effect on the accuracy of the intensity value measured by a single-value detector. For example, FIG. 1 shows a plot comparing various intensity profiles for a recording head produced by the Eastman Kodak Company. In this particular case, the recording head employs a spatial light modulator having 896 channels. Three different intensity profiles are illustrated in accordance with the KEY of the FIG. 1 plot. The various intensity values are shown in arbitrary units. A multi-value detector intensity profile 450 acts as a base-line to compare the accuracy of a first single-value detector intensity profile 460 and a second single-value detector intensity profile 470. Each of the multi-value detector intensity profile 450, the first single-value detector intensity profile 460 and the second single-value detector intensity profile 470 have been "smoothed" for clarity and therefore do not show scatter among individual intensity value data points that each of the profiles was generated from.

Multi-value detector intensity profile 450 represents a condition where each of the channels in the array has been balanced using a multi-value detector (i.e. a laser beam profiler) in a manner similar to that previously described. In this case, the intensity level of various channels was determined using the multi-value detector, and control levels of each of the channels were adjusted to balance the channels to produce the substantially level multi-value detector intensity profile 450. Each of the first single-value detector intensity profile 460 and the second single-value detector intensity 470 were generated with the use of a single-value detector. Specifically, after the spatial light modulator channels were balanced using the multi-value detector, the intensities of different sets of the balanced channels were measured using the single-value detector in a manner similar to that previously described. A plurality of first channel sets, each comprising thirty two (32) channels was used to generate the first single-value detector intensity profile 460 while a plurality of second channel sets, each comprising three (3) channels was used to generate the second single-value detector intensity profile 470.

The FIG. 1 plot shows that despite having accurately balanced the spatial light modulator channels using a multi-value detector, each of the first single-value detector intensity profile 460 and the second single-value detector intensity profile 470 show deviations from this balanced condition. In this regard, each of the first single-value detector intensity profile 460 and the second single-value detector intensity profile 470 is distorted. The first single-value detector intensity profile 460 that was generated using the first channel sets comprising thirty two (32) channels is shown deviating by about 1% from the uniform multi-value detector intensity profile 450 while the second single-value detector intensity profile 470 that was generated using second channel sets comprising three (3) channels shows as much as 4% deviation. Although they do not wish to be bound by any particular theory, the present inventor believes that due to the details of the operation of the spatial light modulator and the propagation of the radiation in the recording head, an intensity profile generated using a single-value detector will typically deviate from an intensity profile generated with a multi-value detector. The deviation magnitude depends on the number of channels in the detected channel sets, with stronger deviations resulting from channel sets having fewer numbers of channels.

There is a need to provide improved methods and systems for calibrating a spatial light modulator. There is a further need to provide improved methods and systems for reducing deviations in an intensity profile generated for a spatial light modulator using a single-value detector.

SUMMARY OF THE INVENTION

Briefly, according to one aspect of the present invention a method for calibrating a spatial light modulator comprising an array of individually addressable channels includes selecting a plurality of channel sets from the array of channels; operating each of the channel sets to provide corresponding output radiation; providing a detector for measuring the output radiation provided by each of the channels sets; determining a plurality of intensity values, wherein each intensity value is a single value representing an intensity of the output radiation provided by a different one of the channel sets; providing a correction factor for each of the channels sets, wherein each correction factor remains constant during a subsequent recalibration of the spatial light modulator; modifying each determined intensity value in accordance with a corresponding one of the correction factors; determining a difference between one of the modified intensity values and a target intensity value; and reducing the determined difference by adjusting a control level of at least one channel in the channel set corresponding to the one of the modified intensity values.

The invention and its objects and advantages will become more apparent in the detailed description of the preferred embodiment presented below.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive sense.

Figure 2:
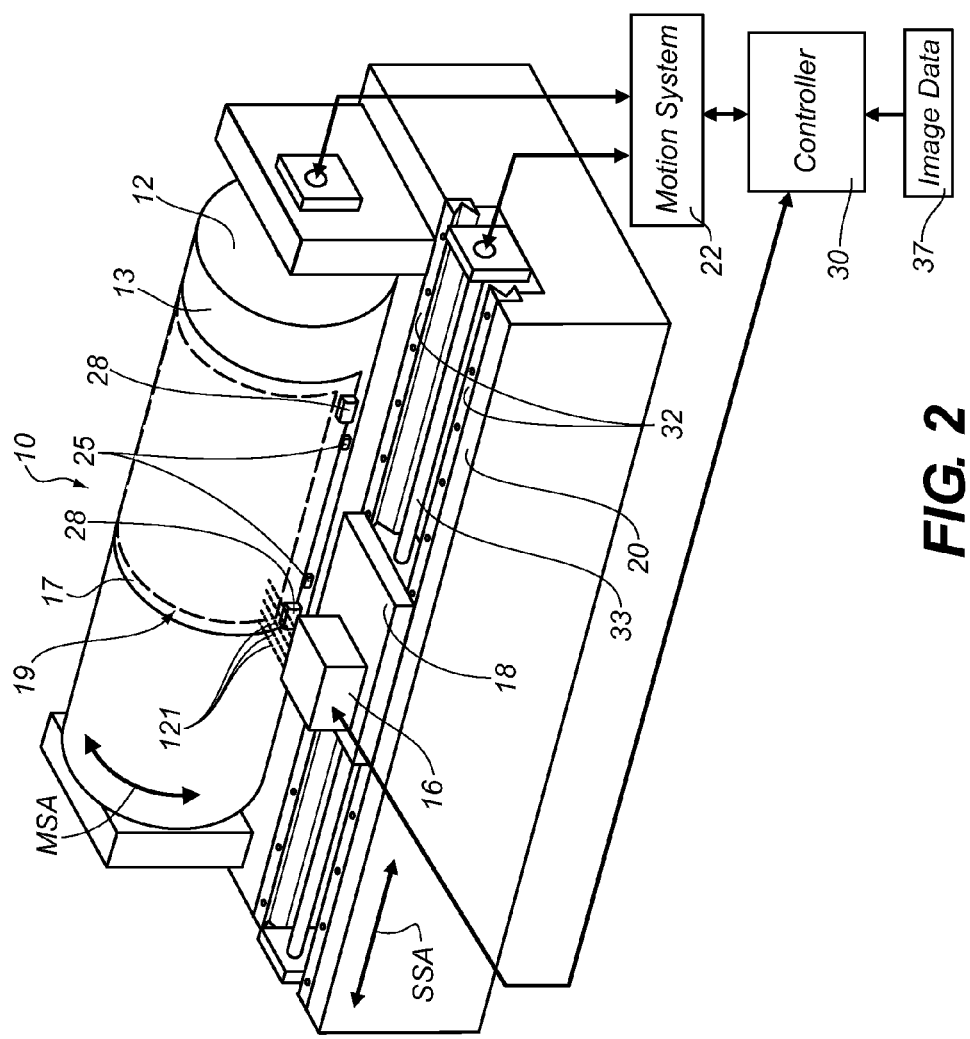
FIG. 2 schematically shows a recording apparatus for forming an image on a recording media as employed in an example embodiment of the invention.

FIG. 2 schematically shows a recording apparatus 10 for forming an image 19 (i.e. schematically represented by broken lines) on a recording media 17 as employed in an example embodiment of the invention. Recording media 17 can include various media comprising a surface suitable for forming image 19 thereupon. Recording apparatus 10 includes a media support 12, which in this example embodiment is configured as per an external drum configuration. Other embodiments of the invention can include other forms of media supports including internal drum and flat-bed configurations for example.

In this example embodiment, recording media 17 is supported on a cylindrical surface 13 of media support 12. One or more edge portions of recording media 17 are secured to cylindrical surface 13 by clamps 28. In other example embodiments, recording media 17 can be secured to media support 12 by other methods. For example, a surface of recording media 17 can be secured to cylindrical surface 13 by various methods including providing a low-pressure source between the surfaces. In various example embodiments, media support 12 is movably coupled to support 20. In this example embodiment, media support 12 is rotationally coupled to support 20. In this example embodiment, media support 12 includes a plurality of registration features 25. Registration features 25 are employed to orient recording media 17 with respect to media support 12 in a desired orientation.

Recording apparatus 10 includes recording head 16, which is movable relative to media support 12. In this example embodiment of the invention, media support 12 is adapted to move by rotating about its rotational axis. In this example embodiment, recording head 16 is mounted on movable carriage 18. Carriage 18 is operated to cause recording head 16 to be moved along a path aligned with the rotational axis of media support 12. Motion system 22 is employed to provide relative movement between recording head 16 and media support 12. Motion system 22 (which can include one or more motion systems) can include any suitable drives needed for the required movement. In this example embodiment of the invention, motion system 22 is used to move media support 12 along a path aligned with main-scan axis MSA and is used to move recording head 16 along a path aligned with sub-scan axis SSA. Guide system 32 is used to guide carriage 18 which is moved under the influence of transmission member 33. In this example embodiment of the invention, transmission member 33 includes a precision screw mechanism. In some example embodiments, several recording heads 16 are moved in a manner where each of the recording heads 16 is moved independently of one another. In some example embodiments, several recording heads 16 are moved in tandem.

Those skilled in the art will realize that various forms of relative movement between recording head 16 and media support 12 can be used in accordance with the present invention. For example, in some cases recording head 16 can be stationary while media support 12 is moved. In other cases, media support 12 is stationary and recording head 16 is moved. In still other cases, both the recording head 16 and the media support 12 are moved. One or both of recording head 16 and media support 12 can reciprocate along corresponding paths. Separate motion systems can also be used to operate different systems within recording apparatus 10.

Controller 30, which can include one or more controllers is used to control one or more systems of recording apparatus 10 including, but not limited to, various motion systems 22 used by media support 12 and carriage 18. Controller 30 can also control media handling mechanisms that can initiate the loading or unloading of recording media 17 to or from media support 12 respectively. Controller 30 can also control recording head 16 to form image 19 in accordance with image data 37. Various systems can be controlled using various control signals or implementing various methods. Controller 30 is programmable and can be configured to execute suitable software and can include one or more data processors, together with suitable hardware, including by way of non-limiting example: accessible memory, logic circuitry, drivers, amplifiers, A/D and D/A converters, input/output ports and the like. Controller 30 can comprise, without limitation, a microprocessor, a computer-on-a-chip, the CPU of a computer or any other suitable microcontroller. Controller 30 can consist of several different or logical units, each of which is dedicated to performing a particular task in various example embodiments of the invention.

In this example embodiment, recording head 16 is adapted for directing output radiation towards recording media 17. The wavelength of the output radiation is selected to suit the type of recording media 17 that is being imaged and can include wavelengths in the infrared, visible and ultraviolet spectrums for example.

In this illustrated example embodiment, recording head 16 is controllable to emit various output radiation beams 121 while scanning over recording media 17 to form image 19. Output radiation beams 121 can be image-wise modulated according to image data 37 specifying the image to be written. Each output radiation beam 121 is controllable to form a unit element of image typically referred to as an image pixel on recording media 17 in accordance with information provided by image data 37. Various image pixels can be combined with other image pixels to form various features of image 19. In various example embodiments of the invention, image pixels can be arranged in various image pixel patterns including halftone patterns, stochastic patterns and hybrid patterns for example.

Image 19 can be formed on recording media 17 by different methods. For example, recording media 17 can include a modifiable surface, wherein a property or characteristic of the modifiable surface is changed when irradiated by an output radiation beam 121. An output radiation beam 121 can be used to ablate a surface of recording media 17 to form an image 19. An output radiation beam 121 can be used to facilitate a transfer of an image forming material to a surface of recording media 17 to form image 19 (e.g. a thermal transfer process). An output radiation beam 121 can undergo a direct path from a radiation source to the recording media 17, or can be deflected by one or more optical elements towards the recording media 17.

In many cases, image 19 is formed by merging multiple sub-images together, each of the sub images being formed during a corresponding marking operation. The sub-images can be formed in different manners. For example, image 19 can be formed from plurality of markings referred to as "shots." During each shot, recording head 16 is positioned relative to a region of recording media 17. Once positioned, recording head 16 is activated to form an arrangement of image pixels on the region of recording media 17. Once the arrangement of image pixels is formed, relative movement between recording head 16 and recording media 17 is effected to position the recording head 16 in the vicinity of an adjacent region and another shot is taken to form a next image pixel arrangement.

The various sub-images can also be formed by scanning. In some example embodiments of the invention, scanning can be performed by deflecting output radiation beams 121 emitted by recording head 16 relative to recording media 17. In some example embodiments, scanning can include establishing relative movement between the recording head 16 and recording media 17 as recording head 16 is activated to form corresponding image pixels. In these example embodiments, columns of image pixels are formed along a scan direction as relative movement between recording head 16 and the recording media 17 is established. Relative movement can include moving one or both of the recording head 16 and recording media 17. Each of the scanned image pixel columns are combined to form a sub-image typically referred to as an image swath.

Different scanning techniques can be employed to form image swaths. For example, "circular" scanning techniques can be used to form "ring-like" or "circular" image swaths. A circular image swath can be formed when controller 30 causes recording head 16 to emit output radiation beams 121 while maintaining recording head 16 at a first position along sub-scan axis SSA and while moving media support 12 along a direction of main-scan axis MSA. In this regard, scanning occurs solely along a main-scan direction. After the completion of a first circular image swath, recording head 16 is moved to a second position along sub-scan axis SSA. A second circular image swath is then formed as recording head 16 is operated to emit output radiation beams 121 while maintaining recording head 16 at second position and while moving media support 12 along a direction of main-scan axis MSA.

Helical scanning techniques can be employed to form helical image swaths which are formed in a spiral or helical fashion over a surface of recording media 17. For example, helical image swaths can be formed when controller 30 causes recording head 16 to emit output radiation beams 121 while simultaneously causing recording head 16 to move along a direction of sub-scan axis SSA and media support 12 to move along a direction of main-scan axis MSA. In this regard, scanning occurs along both a main-scan direction and along a sub-scan direction and each helical image swath comprises an orientation that is skewed relative to main-scan axis MSA.

It is to be noted that other forms of skewed scanning techniques similar to helical scanning techniques can be used in various embodiments of the present invention. Skewed scanning techniques need not be limited to external drum configurations but can also be employed with other configurations of recording apparatus. For example, in some internal drum recording apparatus, media is positioned on a concave surface of a media support while a radiation beam is directed towards an optical deflector positioned along a central axis of the media support. The optical deflector is rotated while moving along central axis to cause the radiation beam to follow a spiral path on the surface of the recording media. Flat-bed recording devices can include coordinated movement between a recording head and the recording media to form various image swaths with a particularly desired orientation.

Figure 3:
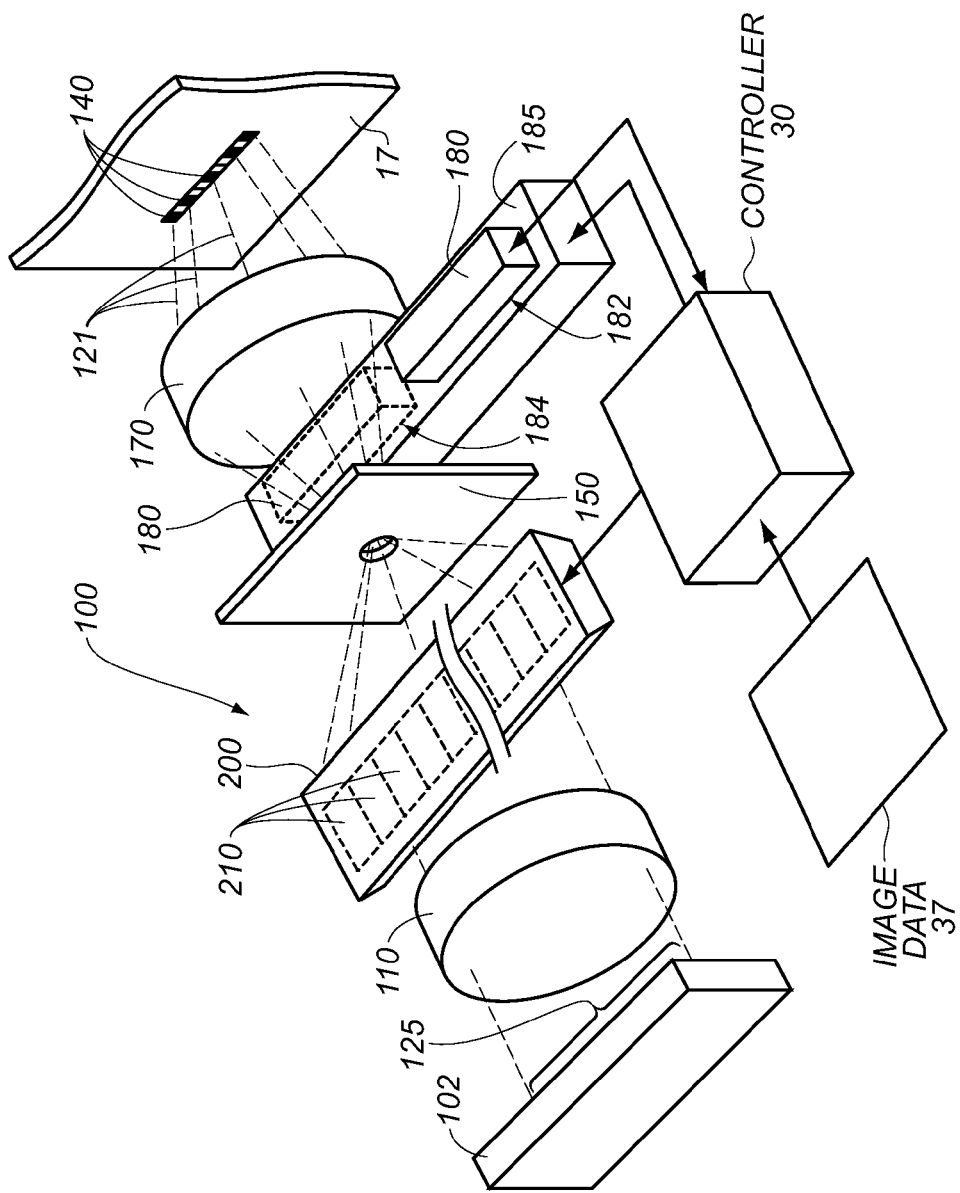
FIG. 3 schematically shows an optical system employed in an example embodiment of the invention.

FIG. 3 schematically shows an optical system 100 employed by recording head 16 as per an example embodiment of the invention. Optical system 100 includes an illumination source 102 which can include a laser for example and a spatial light modulator 200. Suitable lasers can include laser diode arrays which are relatively easy to modulate, and have relatively small size and low cost. The choice of illumination source 102 can be motivated by various properties of recording media 17. One or more optical elements 110 are positioned along the path of radiation 125 emitted by illumination source 102 towards spatial light modulator 200. Optical elements 110 can include one or more lenses employed to condition radiation 125 in various ways. For example, when diode laser arrays are employed, various degrees of beam divergence can exist along each of a plurality of different directions. Beam divergence can include fast axis divergence and slow axis divergence for example. Optical elements 110 can include various lenses such as micro-lenses or crossed cylindrical lenses that are adapted to correct for these divergences. Optical elements 110 can include various elements adapted to mix or reflect radiation 125 such as light pipes and fly's eye integrators for example. Optical elements 110 can include various lenses adapted to focus or redirect radiation 125 emitted by illumination source 102.

Radiation 125 that is directed onto spatial light modulator 200 is modulated in accordance with controller 30 which selectively controls various individually addressable channels 210 (i.e. schematically represented in broken lines) of spatial light modulator 200 to form various radiation beams. In this example embodiment, channels 210 are arranged in a one dimensional array. In other example embodiments, channels 210 can be arranged in two dimensional arrays. Image data 37 is employed by controller 30 to generate various output radiation beams 121 which are directed along a path towards an imageable surface of a recording media 17 to form various image pixels 140 thereon. Other radiations beams (not shown) that are not required by the formation of various image pixels 140 are directed elsewhere. In this regard control levels of each channel 210 are altered in accordance with a desire to form or not form an output radiation beam 121.

In this illustrated embodiment, the output radiation beams 121 required to form image pixels 140 pass through an aperture 150 while radiation beams not required to form image pixels 140 (i.e. again not shown) are obstructed by aperture 150. One or more lenses (not shown) may be employed to direct radiation from spatial light modulator 200 towards aperture 150. One or more optical elements 170 are employed to direct various output radiation beams 121 onto the imageable surface of recording media 17. Various other embodiments of the invention need not employ aperture 150, and radiation beams not required by the formation of various image pixels 140 may fall by design outside the entrance pupil of a lens of optical elements 170.

Figure 4A:
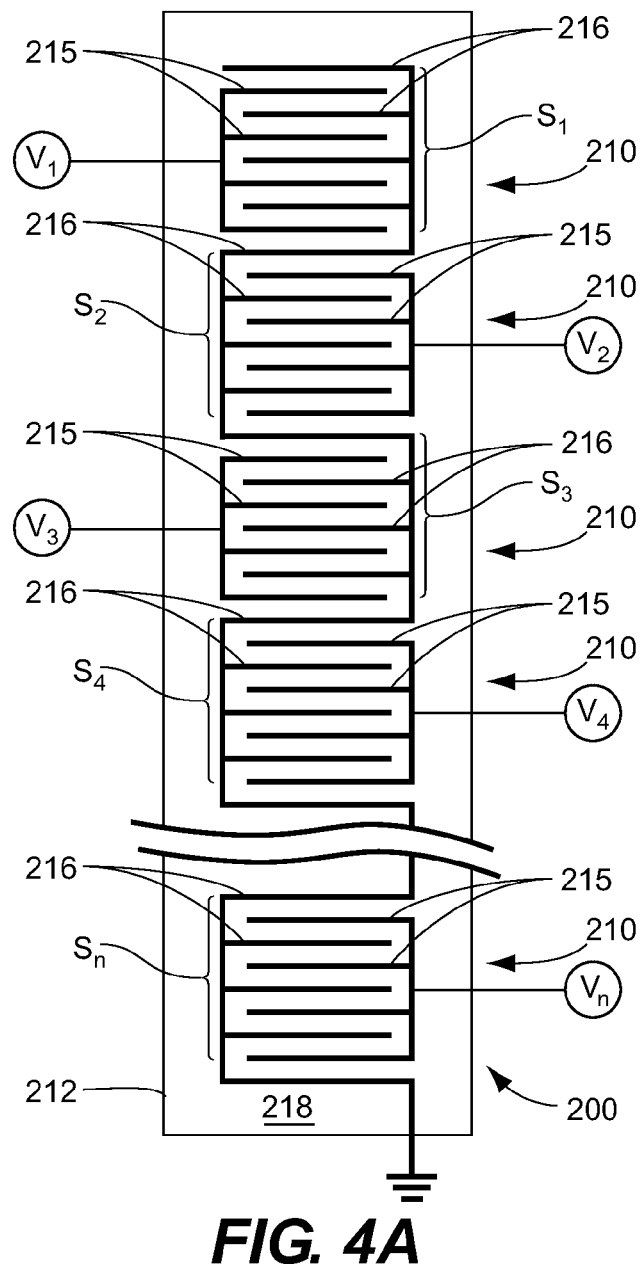
FIG. 4A schematically shows a plan view of a spatial light modulator employed by an example embodiment of the invention.
Figure 4B:
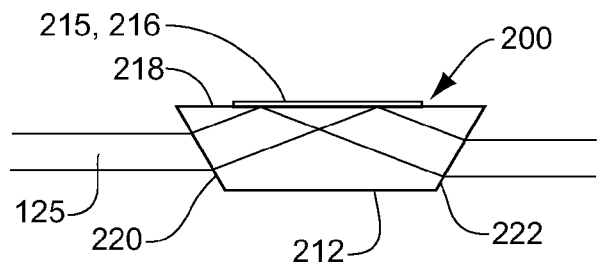
FIG. 4B schematically shows a side view of the spatial light modulator of FIG. 4A.

FIGS. 4A and 4B schematically show respective plan and side views of a spatial light modulator 200 employed by an example embodiment of the invention. In this example embodiment of the invention, spatial light modulator 200 is a total internal reflection (TIR) spatial light modulator. Spatial light modulator 200 comprises a member 212 which includes an electro-optic material and a plurality of electrodes 215 and 216 arranged in an interdigitated relationship on a surface 218 of member 212. Member 212 includes surfaces 220 and 222 which are arranged to cause radiation 125 to refract and undergo total internal reflection at surface 218.

The various electrodes 215 and 216 are grouped into electrode groups $S_1$, $S_2$, $S_3$, $S_4$ ... $S_n$ which are collectively referred to as electrode groups S. Each of the electrode groups S corresponds to a channel 210 of spatial modulator 200. Each of the electrodes 215 in each of the groups are coupled together and driven with corresponding one of individually addressable voltages sources $V_1$, $V_2$, $V_3$, $V_4$ ... $V_n$ which are collectively referred to as voltage sources V. Each of the individually addressable voltages sources V is employed to alter the control levels of a corresponding channel 210 in accordance with various image data 37 signals. To simplify interconnect and driver requirements, all electrodes 216 are interconnected to a common source (e.g. a ground potential). In this case, electrodes 216 are coupled in a serpentine fashion among all the electrode groups S. In other example embodiments, the electrodes 216 in each of the electrode groups S are driven with one of a plurality of individually addressable voltage sources (not shown) as described in commonly assigned U.S. patent application No. Ser. 12/183,094 which is herein incorporated by reference.

Upon the application of a suitable control voltage by one of the voltage sources $V_1$, $V_2$, $V_3$, $V_4$ ... $V_n$ to a corresponding one of the electrode groups $S_1$, $S_2$, $S_3$, $S_4$ ... $S_n$, an electric field is established in a region of the electro-optic material corresponding to a channel 210. The application of the voltage alters the refractive index of the electro-optic material, thereby changing a birefringent state of the region. Under the application the corresponding drive voltage, the arrangement of electrodes 215 and 216 in each of the electrode groups $S_1$, $S_2$, $S_3$, $S_4$ ... $S_n$ causes each of the electrode groups to behave in a manner similar to a diffraction grating. A birefringent state of the each of the regions can therefore be changed in accordance with the selective application of various voltages by corresponding voltage sources $V_1$, $V_2$, $V_3$, $V_4$ ... $V_n$. For example, in this case when no voltage is applied to a particular electrode group S, the corresponding channel 210 assumes a first birefringent state in which an output radiation beam 121 is provided from surface 222 and is directed towards a surface of a recording media 17 to form an image pixel 140 thereon. In the case when a suitable voltage is applied to a particular electrode group S, the corresponding channel 210 assumes a second birefringent state in which radiation is provided from surface 222 in a diffracted form which can be blocked by an obstruction such as aperture 150 to not form an image pixel 140.

In various example embodiments of the invention, control voltages are selectively imposed on each of the electrode groups S in accordance with a desired activation state of a channel 210 associated with each of the electrode groups S. Activation states can include for example: an ON state in which a channel 210 is activated to form an image pixel 140 on recording media 17 and an OFF state in which a channel 210 is activated to not to form a corresponding image pixel 140 on recording media 17. It is to be noted that some leakage effects may be present and some amount of radiation may be directed towards recording media 17, even when a particular channel 210 is activated with an OFF state.

In various example embodiments of the invention, the control levels of a given channel 210 can be adjusted to cause different birefringent states to be imposed in the electro-optic material associated with the channel 210 such that various degrees of diffraction are established for each of the states. Different birefringent states can be used to adjust the intensity of output radiation beams 121 provided by a corresponding channel 210. In this regard, different channels 210 can be attenuated to different levels in accordance with the degree of diffraction that is established in each of the channels 210. A given channel 210 can be attenuated to a desired level by directing a portion of the radiation provided by the channel towards an obstruction such as aperture 150 thereby blocking it from reaching the surface of recording media 17 and directing another portion of the radiation provided by the channel to form an output radiation beam 121. It is understood that other types of spatial light modulators 200 can be employed and the present invention is not limited to TIR spatial light modulators. Attenuation method of various channels 210 in these other spatial light modulators 200 can vary in accordance with the particular architecture of each modulator.

In this example embodiment, detector 180 is provided for detecting radiation provided by various sets of channels 210. Detector 180 can include various sensors including various photo-sensors for example. In this example embodiment, detector 180 is a single-value detector. Detector 180 can include a large area photodiode by way of example. In this example embodiment, detector 180 is capable of detecting radiation from various combinations of output radiation beams 121 provided by spatial light modulator 200. In conjunction with controller 30, detector 180 can be used to determine a single intensity value for each of the provided combinations of output radiation beams 121. In this example embodiment, detector 180 is positioned to receive radiation provided by spatial light modulator 200 after the radiation has been conditioned by aperture 150. In this example embodiment, detector 180 is positioned to intersect radiation provided by spatial light modulator 200 at a location upstream of a final lens of optical elements 170. In some example embodiments, detector 180 is not located within recording head 16. For example, detector 180 can be positioned at a location on support 20 that can be irradiated by output radiation beams 121. Detector 180 can also be positioned on movable media support 12, but additional communications complications between detector 180 and controller 30 may need to be addressed in this configuration.

In this example embodiment, detector 180 is movable from a non-sampling position 182 which does not intersect a path of travel of output radiation beams 121, to a sampling position 184 which is along a path of travel of output radiation beams 121. Detector 180 is shown in broken lines at sampling position 184. An actuator system 185 is used to position detector 180 between the non-sampling position 182 and the sampling position 184. Actuator system 185 can include various suitable drives (e.g. electric motors) and guide systems. In this example embodiment, radiation provided by spatial light modulator 200 is detected when recording head 16 is not employed to form image 19 on recording media 17. Controller 30 can be programmed to operate detector 180 on a predetermined schedule. Additionally, or alternatively, detector 180 can be operated to detect radiation provided by spatial light modulator 200 in an "on-demand" fashion as requested by an operator via a suitable user interface.

Once positioned in the sampling position, detector 180 measures substantially all of the total intensity of the radiation that passes through aperture 150. Detector 180 can be physically removed from the optical path once the measurement is taken. In this example embodiment, detector 180 provides a single intensity value representing the total intensity of the output radiation that would emerge at the output of recording head 16 if detector 180 had been located at the non-sampling location 182. In this example embodiment, data provided by detector 180 does not contain any information on how the radiation intensity is spatially distributed. In this example embodiment, detector 180 cannot tell how much energy would be received by each image pixel that could be formed by a channel set comprising multiple channels 210.

In some example embodiments, detector 180 need not detect the entirety of each output radiation beam 121 that is provided by spatial light modulator 200. For example, a beam splitter (not shown) can be employed to provide a predetermined portion of each output radiation beam 121 to detector 180 while allowing remaining portions of each output radiation beam 121 to travel along other paths. Those skilled in the art will realize that the present invention can employ various methods to direct output radiation beams 121 from spatial light modulator 200 to detector 180.

Figure 5:
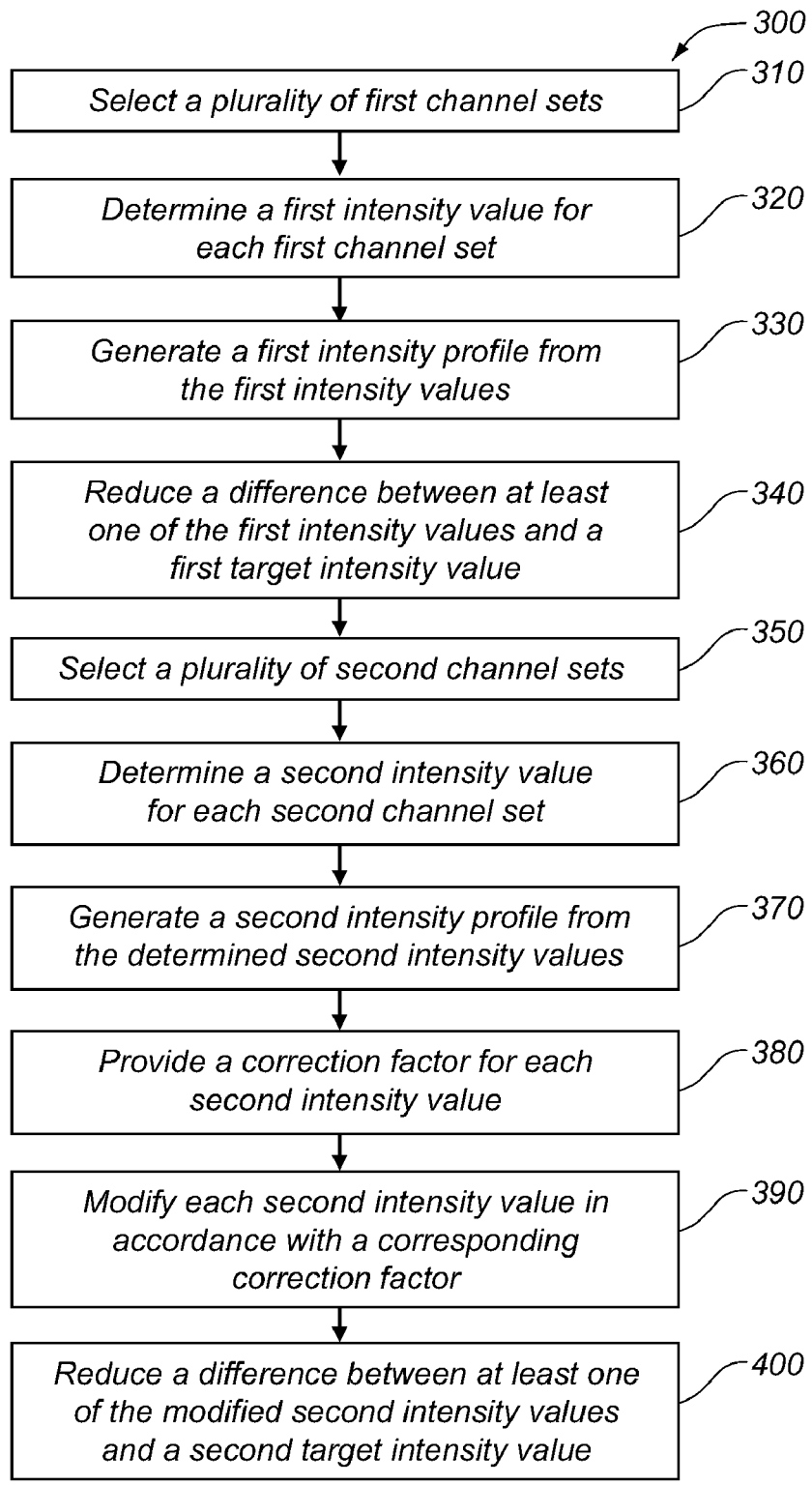
FIG. 5 shows a block diagram representing a method for calibrating a spatial light modulator as per an example embodiment of the invention.
Figure 6:
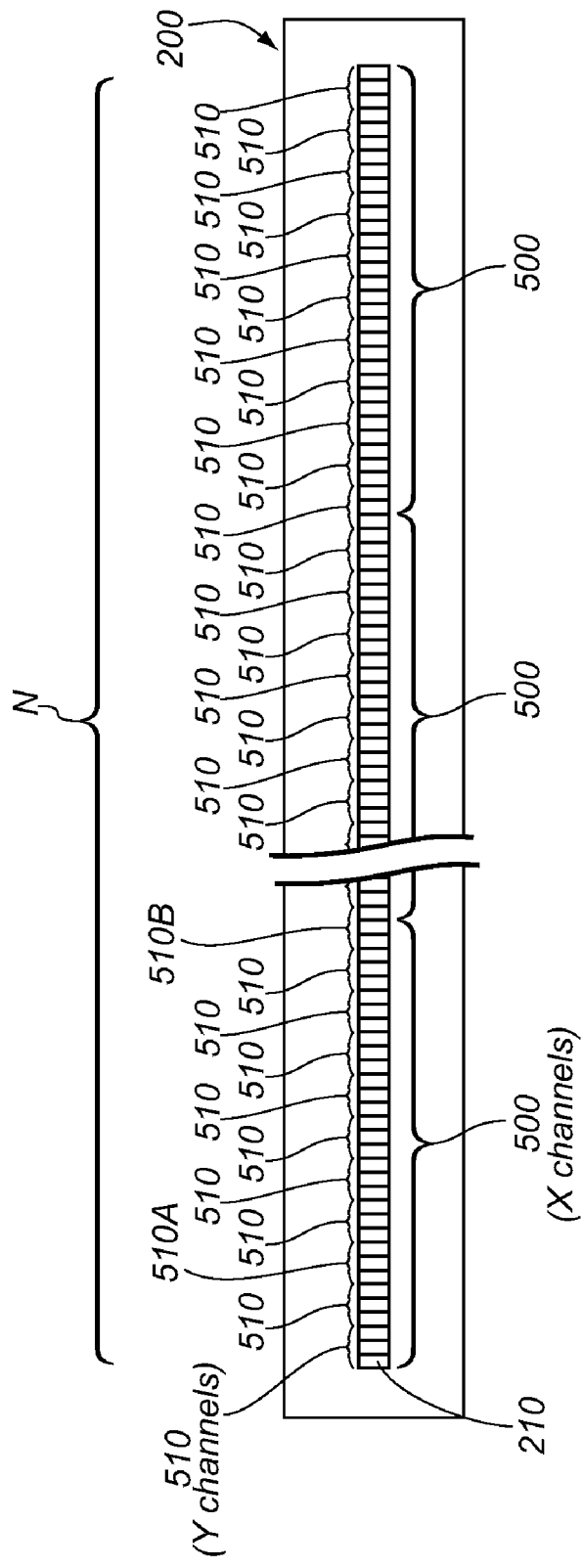
FIG. 6 schematically shows a plurality of different channel sets selected from a spatial light modulator in accordance with an example embodiment of the invention.

FIG. 5 shows a block diagram representing a method 300 for calibrating a spatial light modulator 200 in accordance with an example embodiment of the invention. In this example embodiment, the calibration includes beam balancing the output radiation beams 121 provided by spatial light modulator 200. Various steps of method 300 are described with reference to recording apparatus 10 and corresponding optical system 100 respectively illustrated in FIGS. 2 and 3. This is for illustration purposes only, and other suitable recording apparatus can be employed in other example embodiments of the invention. Method 300 additionally refers to various sets of channels 210 selected from spatial modulator 200. One arrangement of the various sets of channels 210 employed in an example embodiment of the invention is schematically represented in FIG. 6.

In step 310, the various sets of channels 210 are selected from spatial light modulator 200. Specifically, a plurality of first channel sets 500 is selected from the array of channels 210. In this example embodiment, spatial light modulator 200 includes N channels 210, from which a plurality of first channel sets 500 numbering Q is selected. In this example embodiment, each of the first channel sets 500 includes an equal number of channels 210 numbering X. In various example embodiments, each channel 210 in the array is part of at least one of the first channel sets 500. In this example embodiment, each channel 210 is part of only one of the first channel sets 500.

Figure 1:
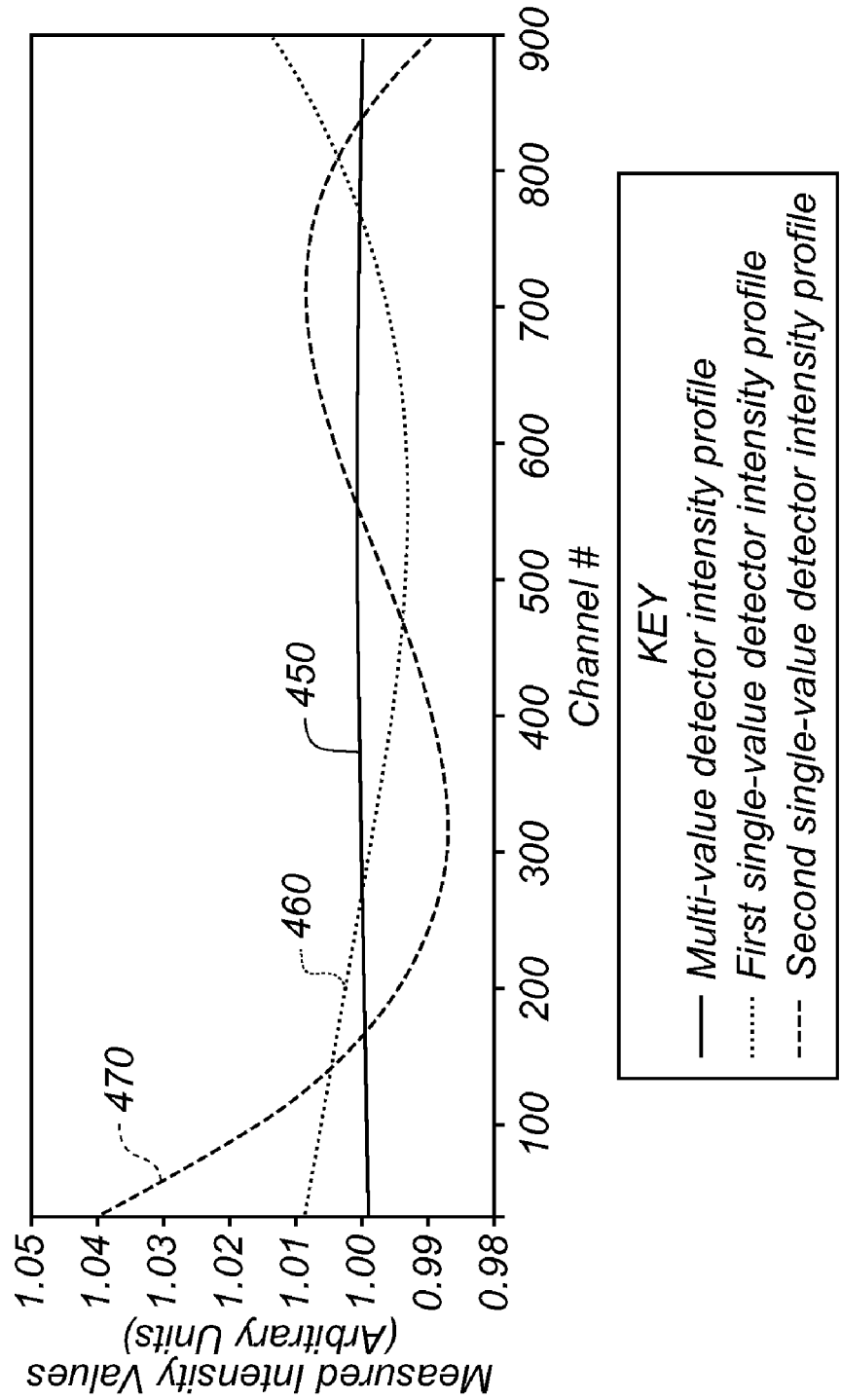
FIG. 1 shows a plot comparing various single-value detector intensity profiles with a multi-value detector intensity profile.

In this example embodiment, the number of channels 210 in each of the first channel sets 500 is selected to limit the size of distortions in an intensity profile that is to be subsequently generated by employing detector 180 to measure output radiation provided by each of the first channels sets 500. As previously described, distortion in an intensity profile generated by a single-value detector can be reduced by employing channels sets having relatively large numbers of channels 210. For example, for the previously described recording head 16 comprising a total of 896 channels as referenced in FIG. 1, first channel sets 500 comprising thirty (32) channels 210 would typically be associated with smaller intensity profile distortions than first channel sets 500 comprising only three (3) channels 210.

In step 320, a plurality of first intensity values is determined. Each of the first intensity values corresponds to radiation provided by one of the first channel sets 500. Each of the first channel sets 500 is separately operated to provide output radiation. In this example embodiment, all of the X channels 210 in a given first channel set 500 are operated in accordance with substantially the same control levels. During the operation of a given first channel set 500, the total intensity of corresponding outputted radiation is measured by detector 180 while the control levels of all of the other channels 210 belonging to the other first channel sets 500 are set to maximum attenuation. A corresponding set of measured intensity levels $I_M$ is thus determined for the plurality of first channel sets 500. This procedure neglects contributions from the channels 210 that were set to maximum attenuation (i.e. turned "OFF"). In practice, contribution to the intensity of a given output radiation beam 121 from a fully attenuated channel 210 is small, but not zero due to leakage effects. In some cases, the total contribution from all the turned "OFF" channels 210 may even exceed the contribution from the operated first channel set if N>>X as is often the case. In some example embodiments, this problem is alleviated by first setting the control levels of all N channels 210 to the maximum attenuation state so that most of the radiation that reaches spatial light modulator at any location is diffracted and blocked by aperture 150. Since the diffraction is not perfect, a small amount of radiation will not be diffracted and will thus pass through aperture 150. Detector 180 is then employed to measure the total intensity $I_0$ of this non-diffracted radiation. Each of the first intensity values can then be provided by determining an intensity difference $\Delta I$ for each of the first channel sets, where $\Delta I = I_M - I_0$.

Figure 7:
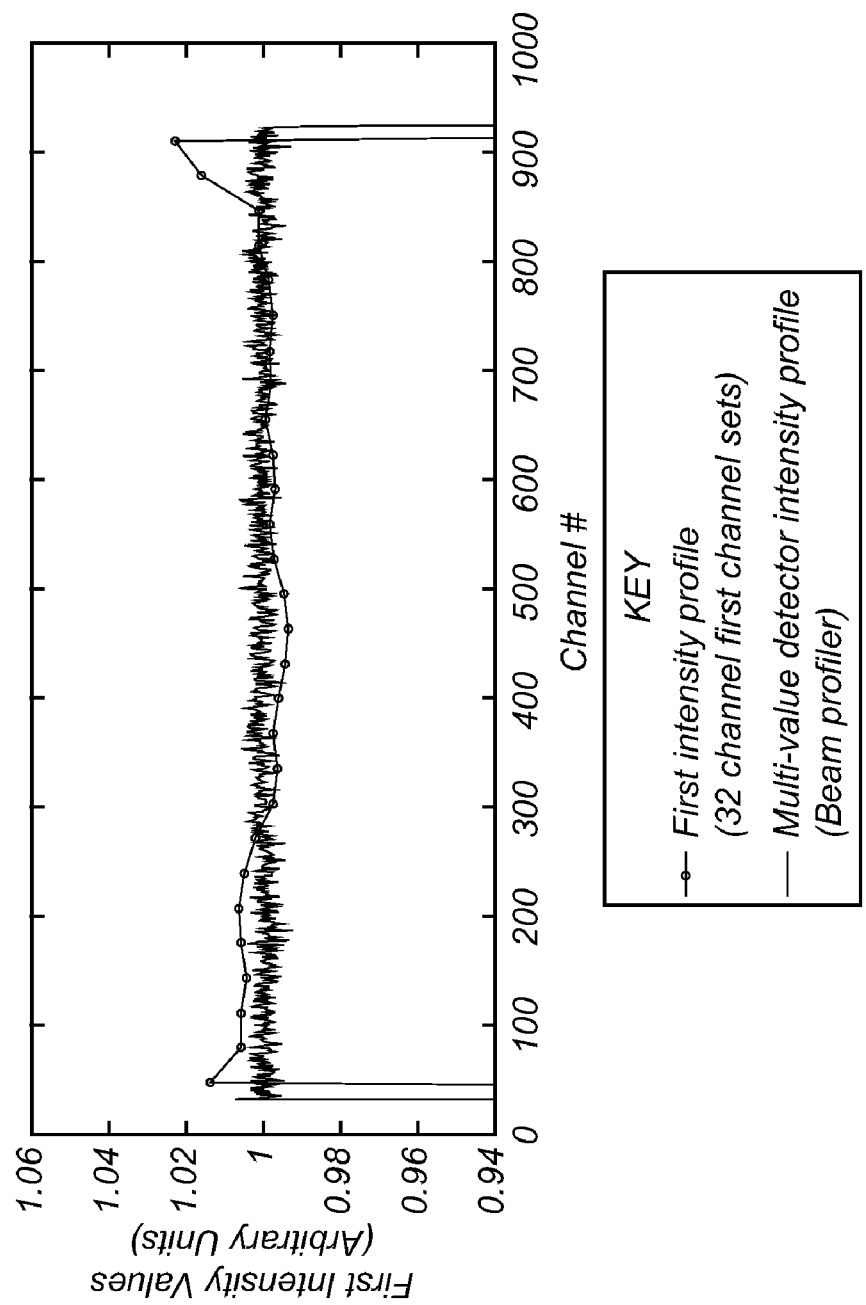
FIG. 7 shows a first intensity profile generated from determined first intensity values as per an example embodiment of the invention.

In step 330, a first intensity profile is generated from the first intensity values. To do this one needs to establish the correspondence between the particular locations in the intensity profile and the various first channels sets 500. In this example embodiment, the first intensity profile is generated by plotting each intensity value as a function of the position of the corresponding first channel set 500 in the array of channels 210. FIG. 7 shows an example of a first intensity profile generated for first channels sets 500, each comprising thirty two (32) channels 210. The various first intensity values are shown in arbitrary units. For comparison purposes, another intensity profile of the same channels 210 as provided by a multi-value detector (i.e. a beam profiler) is shown. Both intensity profiles are identified as per the KEY in FIG. 7. The intensity profile corresponding to the multi-value detector represents a condition where various ones of the channels 210 in the array were balanced using a beam profiler to provide a substantially flat intensity profile. Once balanced using the beam profiler, the channels 210 were grouped into the various first channel sets 500 and corresponding first intensity values were determined for each of the first channel sets 500 using detector 180. FIG. 7 shows deviations between the first intensity profile and the multi-value detector profile. In this regard, the first intensity profile is distorted. However, since a relatively large number of channels 210 (i.e. 32 channels) have been employed in each of the first channels sets 500, differences among the various measured first intensity values are relatively small.

In step 340, a channel set adjustment is performed to reduce a determined difference between at least one of the first intensity values and a first target intensity value. In some example embodiment the first target intensity value is equal to one of the first intensity values. In some example embodiments, the first target intensity value is equal to, or less than, a minimum one of the determined first intensity values. Any determined differences between each of the at least one of the first intensity values and the first target intensity value are reduced by adjusting control levels of a group of the channels 210 in spatial light modulator 200. In this example embodiment, a difference between a given first intensity value and the first target intensity value is reduced by appropriately adjusting the control level of each of the X channels 210 in a corresponding one of the first channels sets 500 in a direction appropriate for reducing the determined difference. In this example embodiment, each of the X channels 210 in an adjusted first channel set 500 is adjusted by the same amount. In this example embodiment, channel control levels in one or more of the first channels sets 500 are adjusted to cause each of the first channels sets 500 to have substantially equal corresponding first intensity values if re-measured by detector 180. In this example embodiment, channel control levels in one or more of the first channels sets 500 are adjusted so that adjusted control levels form a base line for a subsequent calibration step. Adjustment of the control levels of the channels 210 in a given one of the first channel sets 500 can include adjusting an attenuation level of the channels 210.

In step 350, a plurality of second channels sets 510 numbering R is selected from the array of channels 210. Each of the R second channel sets 510 includes Y channels 210. In this example embodiment, each channel 210 in spatial light modulator 200 is part of at least one of the second channel sets 510. In some example embodiments, each channel 210 is part of only one of the second channel sets 510. In some example embodiments, the second channel sets 510 form an ordered sequence within the array of channels 210 and each second channel set 510 is selected in accordance with its position in the ordered sequence. In some example embodiments, each of the second channels sets 510 is selected randomly from the array of channels 210.

As previously described, relatively large deviations can arise in an intensity profile generated by a single-value detector when channels sets having relatively few channels are employed. This effect is more predominate for channel sets having fewer numbers of channels 210. In the extreme, this effect can lead to considerable difficulty in determining an intensity value for a channel set comprising a single channel. Nonetheless, this effect needs to be compensated for. In this example embodiment, the selected number of channels 210 in each of the second channel sets 510 causes relatively large deviations in an intensity profile that is to be subsequently generated from intensity measurements of radiation provided by the second channels sets 510. In this example embodiment, deviations associated with the intensity profile corresponding to the second channel sets 510 are typically larger than deviations associated with the intensity profile corresponding to the first channel sets 500. The number of channels 210 employed in a given second channel set 510 can be limited by the minimum number of channels 210 required to provide output radiation that is detectable by detector 180.

In this example embodiment, the number of channels 210 that is selected in each of the second channels sets (i.e. Y) is less than the number of channels that was selected in each of the first channel sets (i.e. X). In some example embodiments, the number Y is less than the number X by a factor of 8 or more. In some example embodiments of the invention, the number Y is less than the number X by a factor of 10 or more. In this example embodiment, each of the second channel sets 510 comprises a sufficient number of channels 210 to allow corresponding output radiation to be detected by detector 180. The number of channels 210 employed in each of the second channels sets 510 can be selected in various manners, including direct experimentation. The present inventors have employed second channels sets 510 comprising three (3) channels 210 in some calibrations routines.

In this example embodiment, each of the second channels sets 510 comprises channels 210 from one or more of the first channel sets 500. For example, a second channel set 510 (e.g. second channel set 510A) can be selected in its entirety from a single first channel set 500, or different portions of the second channel set 510 (e.g. second channel set 510B) can be selected from different first channels sets 500 such as two adjacent first channel sets 500. In this example embodiment, various ones of the second channel sets 510 are subsets of a first channel set 500. In this example embodiment, each of the second channel sets can comprise channels 210 that were selected from one or more first channel sets 500 whose control levels were adjusted as per step 340.

In step 360, a plurality of second intensity values is determined, each of the second intensity values corresponding to radiation provided by a different one of the second channel sets 510. In this example embodiment, detector 180 is employed to determine each second intensity value. In this example embodiment, each second intensity value is a single value representing the intensity of the combined radiation provided by all the channels 210 within a given second channel set 510. In this example embodiment, each of the second channel sets 510 is separately operated to provide output radiation. In this example embodiment, each of the channels 210 in an operated second channel set 510 is operated in accordance with control levels that were previously set for these channels to reduce differences between various ones of the determined first intensity values and the first target intensity value. Accordingly, various channels 210 in a second channels set 510 are now operated in accordance with previously adjusted control levels.

Figure 8:
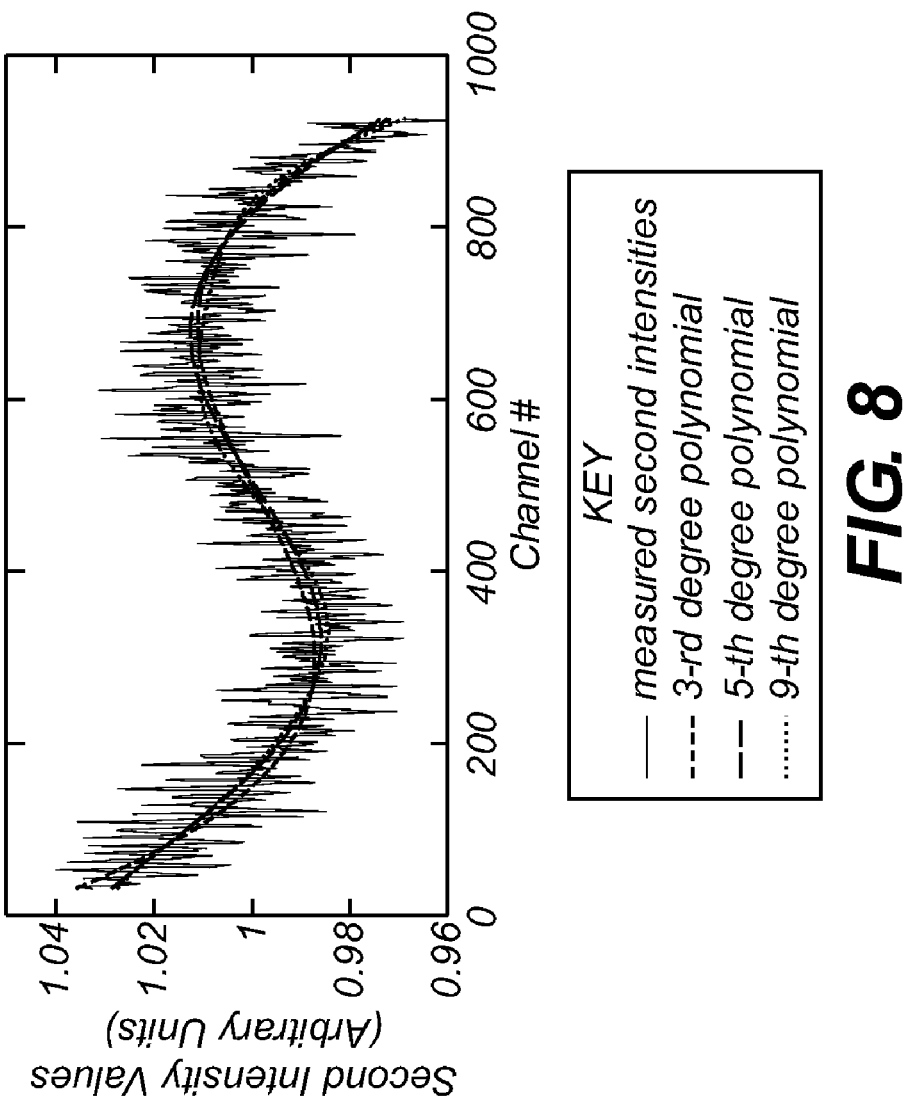
FIG. 8 shows a second intensity profile generated from determined second intensity values as per an example embodiment of the invention.

In step 370, a second intensity profile is generated from the determined second intensity values. FIG. 8 shows a second intensity profile generated from determined second intensity values, each second intensity value corresponding to radiation provided by a second channel set 510 having three (3) channels 210. The second intensity values as well as several mathematical curves that are fitted to the determined second intensity values are identified as per the KEY in FIG. 8. The second intensity profile was generated using a recording head 16 comprising N=896 total channels 210. First channels sets 500, each comprising thirty two (32) channels 210 were previously balanced in a manner similar to that taught by previously described steps 310, 320, 330, and 340. Second channel sets 510, each comprising three (3) channels 210 were selected from the balanced first channel sets 500. FIG. 8 shows that distortions exist in the second intensity profile. These distortions exist despite the fact that various channels 210 in the second channels sets 510 were previously adjusted to balance the thirty two (32) channel first channel sets 500. Although scatter exists among various individual ones of the measured second intensity values, the second intensity profile generated by the entirety of the measured second intensity values is distorted in a characteristic S-shaped manner.

It has been determined that the S-shaped distortion in the second intensity profile represents a systematic error of the measurements that would undergo little change if the measurements were to be repeated. It has been found that since the intensity profile distortions associated with the second channel sets 510 are predominately systematic and repeatable, they can be reliably corrected in accordance with various example embodiments of the invention.

In step 380, a correction factor is provided for each of the second channels sets 510. Since any error in the second intensity value corresponding to a given one of the second channel sets 510 are predominately systematic, the error can be corrected by employing a correction factor that does not change when employed in a subsequent recalibration of spatial light modulator 200. In this example embodiment of the invention, the various correction factors can be determined by fitting a mathematical curve to normalized values of the second intensity values. In this example embodiment, each second intensity value is normalized to the average of all the second intensity values. Accordingly, in this example embodiment, each correction factor is determined based at least on the average of the all the second intensity values as well as the particular second intensity value corresponding to the second channel set associated with the correction factor. In this example embodiment, each correction factor is determined based at least on a value derived by dividing the second intensity value corresponding to the second channel set associated with the correction factor by the average of all of the second intensity values.

Various mathematical curves can be fit to the normalized second intensity values. For example, FIG. 8 shows three different orthogonal polynomials fitted to the normalized second intensity values using the Gram-Schmidt method. The illustrated polynomials include $3^{rd}$ degree, $5^{th}$ degree and $9^{th}$ degree orthogonal polynomials. In particular, $5^{th}$ degree orthogonal polynomials have been employed in the present invention with good results. In this example embodiment, each correction factor is determined from various points on the mathematical curve corresponding to a particular second channel set 510. In various example embodiments, deriving the calibration factors from a mathematical curve can be beneficial since the curve performs a substantial averaging of the data. Each of the determined correction factors can be stored in a controller readable memory for a subsequent recalibration of spatial light modulator 200.

In step 390, each of the intensity values is modified in accordance with a corresponding one of the correction factors. In this example embodiment, each of the second intensity values is modified by dividing the second intensity values by a corresponding one of the correction factors. In this example embodiment, each second intensity value is modified to correct for systematic distortions created in the second intensity profile as measured by detector 180.

In step 400, an adjustment is performed to reduce a determined difference between at least one of the modified second intensity values and a second target intensity value. In example embodiments where the second channel sets 510 are subsets of one or more of the first channel sets 500, this adjustment is referred to as a channel subset adjustment. In some example embodiments, the second target intensity value is equal to one of the modified second intensity values. In some example embodiments, the second target intensity value is equal to, or less than, a minimum one of the modified second intensity values. Any determined difference between a modified second intensity value and the second target intensity value is reduced by adjusting control levels of at least one channel 210 in a corresponding second channel set 510 in a direction appropriate for reducing the determined difference. Since the adjustment of the second channel sets 510 corrects for systematic distortions in the intensity profile, a subsequent recalibration of spatial light modulator 200 can be limited to performing the second channel set adjustments without performing the adjustment of the first channel sets 500.

In some example embodiments, the second target intensity value is the same as the first target intensity value. In other example embodiments, the second target intensity value is different from the first target intensity value. In some example embodiments, a single second target intensity value is compared with each of the modified second intensity values. In other example embodiments, different second target intensity values are compared with different ones of the modified second intensity values. Different second target intensity values can be employed for different reasons including adjusting various channel 210 attenuation levels in accordance with a specific image pattern feature to be formed as taught in commonly-assigned WO 2008/015515, which is hereby incorporated by reference.

In some example embodiments, all the Y channels 210 in a second channel set 510 are adjusted in accordance with a determined difference between a corresponding modified second intensity value and a second target intensity value. In some example embodiments, each of the Y channels 210 in a second channel set 510 is proportionally adjusted. Adjustment of the control levels of the channels 210 in a given one of the second channel sets 510 can include adjusting an attenuation level of the channels 210. In some example embodiments, some, but not all the Y channels 210 in a second channel set 510 are adjusted in accordance with a determined difference between a corresponding modified second intensity value and a second target intensity value.

Figure 9:
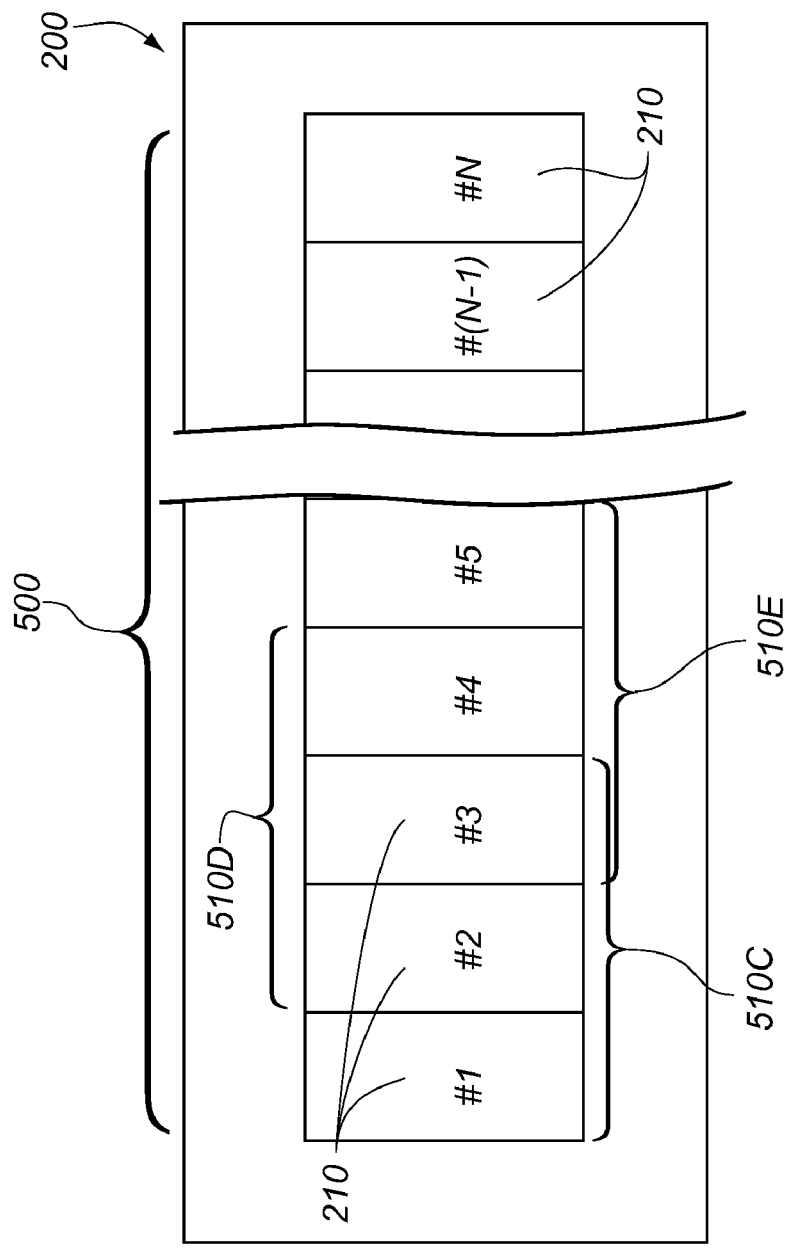
FIG. 9 schematically represents a plurality of second channel sets selected in accordance with an example embodiment of the invention.

FIG. 9 schematically represents a plurality of second channel sets 510 selected in accordance with another example embodiment of the invention. For clarity, the channels 210 in spatial light modulator 200 are identified by #1, #2, #3, #4, #5 . . . #(N−1), #N. This numbering scheme also defines the position of each channel 210 in the array of channels 210. In this example embodiment, various ones of the second channel sets 510 are sub-sets of a first channel set 500.

A first one of the second channel sets 510 (i.e. second channel set 510C) is schematically shown comprising a group of adjacent first, second and third channels 210 respectively identified as #1, #2 and #3. An additional or second one of the second channel sets 510 (i.e. second channel set 510D) is schematically shown comprising a group of adjacent channels 210 respectively identified as #2, #3 and #4. In this regard, second channel set 510D "overlaps" second channel set 510C. In this example embodiment, several of the channels 210 selected for inclusion in second channel set 510D are also selected for inclusion in second channel set 510C. In this example embodiment, adjacent ones of the second channels sets 510 such as second channel sets 510C and 510D include at least one common channel 210 and at least one different channel 210. In this example embodiment, both of the second channel sets 510C and 510D include first channel 210 identified as the #2 channel 210 and a second channel 210 identified as the #3 channel 210.

In this example embodiment, each of the second channels set 510 includes Y consecutive channels 210 where Y is equal to three (3). In this example embodiment, various ones of the second channel sets 510 overlap a adjacent second channel set 510 along arrangement direction of the channel array by an integer number of consecutive channels 210 numbering less than Y. For example, second channel set 510D has been selected by incrementing the channels 210 selected for second channel set 510C to include the #4 channel 210 and by decrementing the second channel set 510C to exclude the #1 channel 210.

Accordingly, second channel set 510D overlaps second channel set 210C by two (2) channels 210. Other second channel sets 510 are also selected in this overlapping fashion. For example, second channel set 510E is schematically shown by incrementing the channels 210 selected for second channel set 510D to include the #5 channel 210 and by decrementing the second channel set 510D to exclude the #2 channel 210. In this example embodiment, this process is repeated to select a total of N minus two (2) second channel sets 510. In other example embodiments, the number of channels 210 incremented and decremented from a given second channel set 510 during the selection of an adjacent second channel set 210 can be a suitable number of channels 210 numbering more than one.

In this example embodiment, each of the second channel sets 510 is separately operated to provide corresponding output radiation that is measured by detector 180 while the control levels of all of the other channels 210 belonging to the other second channel sets 510 are set to maximum attenuation. An intensity value is determined for each output radiation. For example, a first intensity value (i.e. not to be confused with the aforementioned first intensity values provided by the first channel sets 500) is determined for first output radiation provided by all of the #1, #2 and #3 channels 210 in second channel set 510C. A second intensity value is determined for second output radiation provided by all of the #2, #3 and #4 channels 210 in the second channel set 510D. In this regard, the output radiation provided by second channel set 510D includes output radiation provided by some of the channels 210 selected for inclusion in the second channel set 510C (i.e. the #2 and #3 channels) and excludes output radiation provided by at least one of the channels 210 selected for inclusion in the second channel set 510C (i.e. the #1 channel). Other intensity values are determined for the remaining second channel sets 510 in a similar fashion.

After the first intensity value corresponding to the second channel set 510C has been determined, a first adjustment based at least on the determined intensity level is performed. In this example embodiment, the first adjustment is made after all the various intensity values associated with the second channel sets 510 have been determined. In other example embodiments, the first adjustment can be made before the output radiation corresponding to an additional one of the second channel sets 510 is measured. The first adjustment includes adjusting a control level of at least one channel 210 in second channel set 510C without adjusting a control level of another channel 210 in second channel set 510C. In this example embodiment, the control level of the first channel 210 identified as #2 is adjusted, while the control level of the second channel 210 identified as #3 is not adjusted.

This process is repeated for the other second channels sets 510. For example, a second adjustment is performed based at least on the second intensity level determined for the output radiation provided by the second channel set 510D. In a similar fashion, the second adjustment includes adjusting a control level of at least one channel 210 in second channel set 510D without adjusting a control level of another channel 210 in second channel set 510D. In this example embodiment, the control level of the second channel 210 identified as #3 is adjusted, while the control level of each of the first channel 210 identified as #2 and the channel 210 identified as #4 is not adjusted. In this example embodiment, the second adjustment includes adjusting the control level of a channel 210 in second channel set 510D that was previously selected for inclusion in second channel set 510C. In this example embodiment, the second adjustment includes adjusting the control level of a channel 210 that was previously selected for inclusion in second channel set 510C but whose control level was not adjusted by the first adjustment.

In various example embodiments of the invention, each of the adjustments is used to reduce a difference between a determined intensity value and target intensity value. For example, a first difference between the first intensity value corresponding to second channel set 510C and a first intensity target value can be determined and the first adjustment can be performed by adjusting the control level of the #2 channel 210 to reduce the first difference. In a similar fashion, a second difference between the second intensity value corresponding to second channel set 510D and a second intensity target value can be determined and the second adjustment can be performed by adjusting the control level of the #3 channel 210 to reduce the second difference. In some example embodiments, the first adjustment can be performed by adjusting the control level of the #2 channel 210 by an amount proportional to the first difference while the second adjustment can be performed by adjusting the control level of the #3 channel 210 by an amount proportional to the second difference. In some example embodiments the first intensity target value is the same as the second intensity target value while in other example embodiments, the first target intensity value is different than the second target intensity value. In some example embodiments, each of the first adjustment and the second adjustment are made after both the first difference and the second difference have been determined.

In this example embodiment, the first intensity value can be modified in accordance with a first correction factor and the first adjustment can include adjusting the control level of the #2 channel 210 to reduce a difference between the modified first intensity value and a target intensity value. Likewise, the second intensity value can be modified in accordance with a second correction factor and the second adjustment can include adjusting the control level of the #3 channel 210 to reduce a difference between the modified second intensity value and a target intensity value. Correction factors including the first and second correction factors can be determined in manners similar to those described in other example embodiments of the invention.

In this example embodiment, the #2 channel 210 is a centrally located between two channels 210 in the second channel set 510C and the #3 channel 210 is centrally located between two channels 210 in the second channel set 510D. In this example embodiment, each of the #2 and the #3 channels 210 is adjusted in accordance with total output radiation provided by all the channels 210 in their respective second channel sets 510.

The intensity of an output radiation beam 121 provided by a given channel 210 can vary as a consequence of as a function of attenuation levels of its neighboring channels 210. In particular, the present inventors have discovered that a measured intensity value of a single radiation beam 121 provided by a single channel 210 will typically be different than an average intensity value determined from the output radiation provided by a combined group of the channels 210. Advantageously, the present invention reduces measurement errors by employing second channel sets 510 that include a plurality of channels 210. Further advantageously, the selection of the various "overlapping" second channels sets 510 allows for a greater number of intensity values to be determined with channels sets comprising a number of channels 210 that is sufficient to reduce neighbor coupling effects. The greater number of intensity values allows for a more detailed intensity profile to be determined. In this sense, the array of channels 210 is sampled with a higher sampling addressability than the resolution of the samples themselves.

A program product can be used by controller 30 to perform various functions required by recording apparatus 10. One such function can include calibrating a spatial light modulator 200 in accordance with a method or combination of methods taught herein. Without limitation, the program product may comprise any medium which carries a set of computer-readable signals comprising instructions which, when executed by a computer processor, cause the computer processor to execute a method as described herein. The program product may be in any of a wide variety of forms. The program product can comprise, for example, physical media such as magnetic storage media including, floppy diskettes, hard disk drives, optical data storage media including CD ROMs, DVDs, electronic data storage media including ROMs, flash RAM, or the like. The instructions can optionally be compressed and/or encrypted on the medium.

It is to be understood that the exemplary embodiments of the invention are merely illustrative and that many variations of the described embodiments can be devised by those skilled in the art without departing from the scope of the invention. In this regard, it is to be understood that various aspects of one or more of the example embodiments can be combined with aspects of other example embodiments without departing from the scope of the present invention.

PARTS LIST 10 recording apparatus
12 media support
13 cylindrical surface
16 recording head
17 recording media
18 carriage
19 image
20 support
22 motion system
25 registration features
28 clamps
30 controller
32 guide system
33 transmission member
37 image data
100 optical system
102 illumination source
110 optical element(s)
121 output radiation beams
125 radiation
140 image pixel
150 aperture
170 optical element(s)
180 detector
182 non-sampling position
184 sampling position
185 actuator system
200 spatial light modulator
210 channel
212 member
215 electrode
216 electrode
218 surface
220 surface
222 surface
300 method
310 select a plurality of first channel sets
320 determine a first intensity value for each first channel set
330 generate a first intensity profile from the determined first intensity values
340 reduce a determined difference between at least one of the first intensity values and a first target intensity value
350 select a plurality of second channel sets
360 determine a second intensity value for each second channel set
370 generate a second intensity profile from the determined second intensity values
380 provide a correction factor for each second intensity value
390 modify each second intensity value in accordance with a corresponding correction factor
400 reduce a determined difference between at least one of the modified second intensity values and a second target intensity value
450 multi-value detector intensity profile
460 first single-value detector intensity profile
470 second single-value detector intensity profile
500 first channel sets
510 second channel sets
510A second channel set
510B second channel set
510C second channel set
510D second channel set
510E second channel set

The invention claimed is:

1. A method for calibrating a spatial light modulator comprising an array of individually addressable channels, the method comprising:
    selecting a plurality of channel sets from the array of channels, each channel set comprising a plurality of channels;
    operating each of the channel sets to provide corresponding first output radiation;
    determining a plurality of intensity values, each of the intensity values corresponding to the first output radiation provided by a different one of the channel sets;
    selecting a first intensity value from the plurality of intensity values, wherein the first intensity value corresponds to a first channel set in the plurality of channel sets;
    determining a difference between the first intensity value and a first target intensity value;
    performing a channel set adjustment, the channel set adjustment comprising adjusting a control level of each channel in the first channel set to reduce the determined difference between the first intensity value and the first target intensity value;
    selecting a plurality of channel subsets from the first channel set;
    providing a correction factor for each channel subset; and
    performing a channel subset adjustment, the channel subset adjustment comprising adjusting a control level of at least one channel in each of at least one of the channel subsets in accordance with a corresponding one of the correction factors.

2. A method according to claim 1, wherein the channel subset adjustment is performed after performing the channel set adjustment.

3. A method according to claim 2, comprising employing each of the correction factors in a subsequent recalibration of the spatial light modulator, wherein each correction factor remains unaltered during the subsequent recalibration of the spatial light modulator.

4. A method according to claim 3, wherein the channel subset adjustment is performed without performing the channel set adjustment during the subsequent recalibration of the spatial light modulator.

5. A method according to claim 1, wherein the channel subset adjustment comprises:
    selecting a first channel subset from the plurality of channel subsets;
    operating the first channel subset to emit second output radiation;

determining a second intensity value for the second output radiation;

modifying the second intensity value in accordance with the correction factor corresponding to the first channel subset;

determining a difference between the modified second intensity value and a second target intensity value; and performing the channel subset adjustment on the first channel subset to reduce the determined difference between the modified second intensity value and the second target intensity value.

6. A method according to claim 5, wherein the first target intensity value is equal to one of the plurality of intensity values other than the first intensity value.

7. A method according to claim 5, wherein the first target intensity value is determined by a distribution of the plurality of intensity values.

8. A method according to claim 5, wherein the second target intensity value is equal to the first target intensity value.

9. A method according to claim 1, wherein each of the channel sets is operated separately to provide corresponding first output radiation.

* * * * *